(12) United States Patent
Bauer et al.

(10) Patent No.: US 9,371,131 B2
(45) Date of Patent: Jun. 21, 2016

(54) FLOW BODY HAVING A LEADING EDGE, A SURFACE AND AN ACTIVE FLOW CONTROL SYSTEM AND VEHICLE COMPRISING AT LEAST ONE SUCH FLOW BODY AND AN AIR SOURCE

(71) Applicant: Airbus Operations GmbH, Hamburg (DE)

(72) Inventors: Matthias Bauer, Berlin (DE); Frank Haucke, Berlin (DE); Wolfgang Nitsche, Gollenberg (DE); Burkhard Goelling, Buchholz i.d.N. (DE)

(73) Assignee: Airbus Operations GmbH (DE)

( * ) Notice: Subject to any disclaimer, the term of this patent is extended or adjusted under 35 U.S.C. 154(b) by 135 days.

(21) Appl. No.: 13/861,417

(22) Filed: Apr. 12, 2013

(65) Prior Publication Data

US 2013/0277502 A1 Oct. 24, 2013

(30) Foreign Application Priority Data

Apr. 12, 2012 (EP) .................................... 12164009

(51) Int. Cl.
*B64C 21/04* (2006.01)
*B64C 21/06* (2006.01)
(Continued)

(52) U.S. Cl.
CPC .................. *B64C 21/04* (2013.01); *B64C 21/06* (2013.01); *B64C 21/08* (2013.01); *F03D 1/0633* (2013.01); *F03D 7/022* (2013.01); *F15D 1/12* (2013.01); *B64C 2230/04* (2013.01); *B64C 2230/06* (2013.01); *F05B 2240/30* (2013.01); *Y02E 10/721* (2013.01); *Y02E 10/723* (2013.01); *Y02T 50/166* (2013.01); *Y10T 137/85938* (2015.04)

(58) Field of Classification Search
CPC ............ B64C 9/14; B64C 9/22; B64C 9/146; B64C 21/02; B64C 21/025; B64C 21/06; B64C 21/08; F15C 1/08
USPC ........... 244/3.24, 25, 134 B, 198, 199.2, 200, 244/207, 208, 210; 137/835
See application file for complete search history.

(56) References Cited

U.S. PATENT DOCUMENTS

| 3,430,895 A | 3/1969 | Campagnuolo |
| 3,504,691 A | 4/1970 | Campagnuolo et al. |

(Continued)

FOREIGN PATENT DOCUMENTS

| DE | 1600577 A1 | 2/1971 |
| DE | 1650186 A1 | 7/1971 |

(Continued)

*Primary Examiner* — Philip J Bonzell
*Assistant Examiner* — Christopher Hutchens
(74) *Attorney, Agent, or Firm* — Lerner, David, Littenberg, Krumholz & Mentlik, LLP

(57) ABSTRACT

A flow body having a surface, a leading edge has an active flow control system. The active flow control system includes a plurality of openings, at least one control pressure varying device and at least one fluidic actuator with an interaction chamber having an inlet connectable to an air source, at least two outlets and at least two control pressure ports. The openings are distributed along or parallel to the leading edge in a side-by-side relationship and extend through the surface. The control pressure varying device is connected to the at least two control pressure ports in a fluidic manner, wherein the control pressure varying device is adapted to bring about the flow of the fluid at least majoritarily into a respective one of the outlets. Each of the outlets is connected to one individual opening of the plurality of openings.

12 Claims, 8 Drawing Sheets

(51) Int. Cl.
  *B64C 21/08* (2006.01)
  *F15D 1/12* (2006.01)
  *F03D 7/02* (2006.01)
  *F03D 1/06* (2006.01)

(56) References Cited

U.S. PATENT DOCUMENTS

| | | | |
|---|---|---|---|
| 3,528,442 A | | 9/1970 | Campagnuolo |
| 4,718,619 A | * | 1/1988 | Ashill et al. ............... 244/35 R |
| 5,938,404 A | | 8/1999 | Domzalski et al. |
| 6,390,116 B1 | | 5/2002 | Kim et al. |
| 7,128,082 B1 | * | 10/2006 | Cerretelli et al. ............... 137/14 |
| 8,382,043 B1 | * | 2/2013 | Raghu ............... 244/207 |
| 2011/0309201 A1 | * | 12/2011 | Hassan et al. ............... 244/207 |
| 2012/0001028 A1 | * | 1/2012 | Frey et al. ............... 244/208 |
| 2013/0062473 A1 | * | 3/2013 | Golling et al. ............... 244/208 |
| 2013/0284294 A1 | * | 10/2013 | Golling et al. ............... 137/833 |

FOREIGN PATENT DOCUMENTS

| | | |
|---|---|---|
| DE | 602006001040 T2 | 7/2009 |
| DE | 102009011662 A1 | 9/2010 |

* cited by examiner

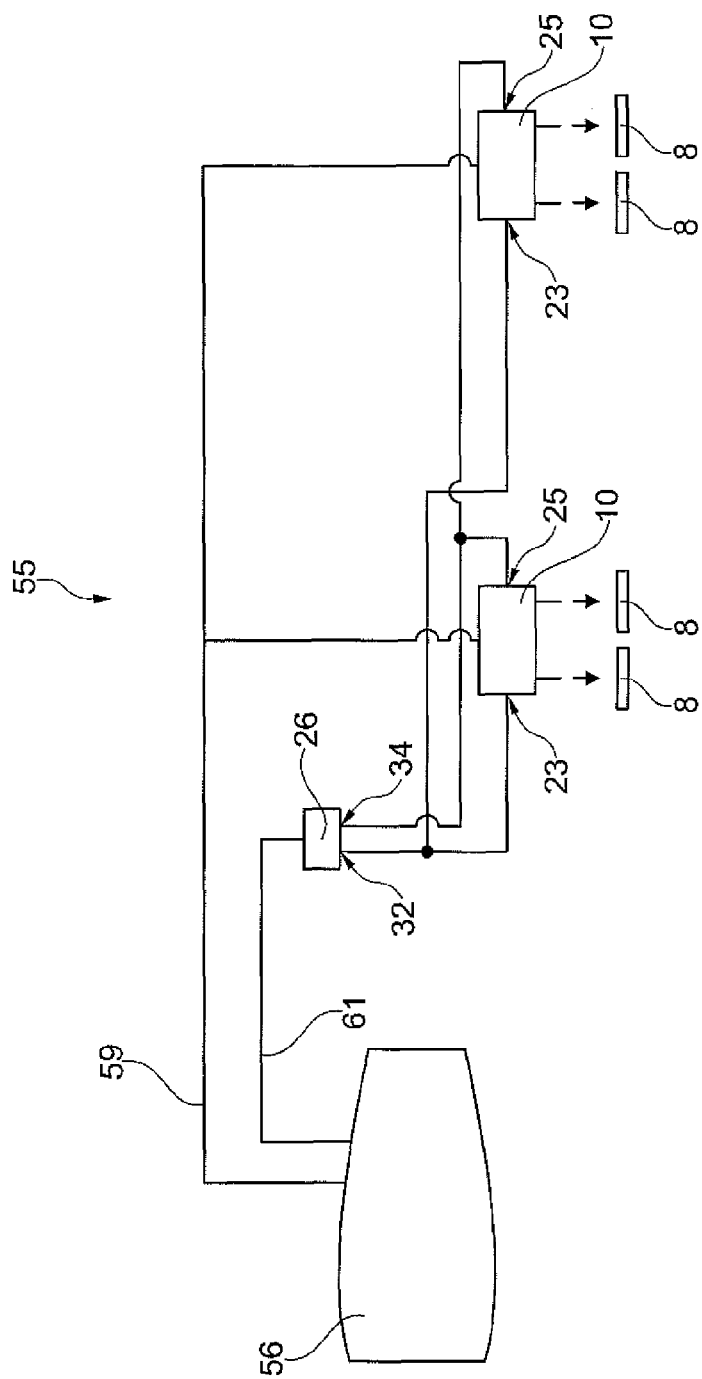

FLOW BODY HAVING A LEADING EDGE, A SURFACE AND AN ACTIVE FLOW CONTROL SYSTEM AND VEHICLE COMPRISING AT LEAST ONE SUCH FLOW BODY AND AN AIR SOURCE

CROSS-REFERENCE TO RELATED APPLICATIONS

This application claims the benefit of the filing date of European Patent Application No. 121 64 009.8 filed Apr. 12, 2012, the disclosure of which application is hereby incorporated herein by reference.

TECHNICAL FIELD

The invention relates to a flow body having a leading edge, a surface and an active flow control system and a vehicle comprising at least one such flow body and an air source.

BACKGROUND OF THE INVENTION

Flow bodies as parts of a vehicle or of another apparatus subjected to a surrounding flow are often required to show aerodynamic characteristics that result in a substantially fully attached flow in a variety of flow conditions. For example, commercial aircraft are designed for wide flow velocity and altitude ranges. In boundary conditions, such as during high lift flight, it is possible to use active flow control systems for preventing flow separation from an aircraft wing or other surfaces. In comparison to conventional surfaces active flow control can lead to an increased lift by eliminating separations, while holding the angle of attack constant, or by delaying the stall of a particular surface to higher degrees of flow incidence, consequently increasing the lift as well. This is expedient and advantageous especially for wings of an aircraft, vertical or horizontal tail planes or other control surfaces attached to a part of an aircraft.

It is known to employ fluidic actuators for influencing the flow along a flow surface of a flow body. These fluidic actuators maybe realized in such a way that they provide a pulsed ejection from opening in the flow surfaces. This ejection is able to delay separations to higher flow incident angles by introducing vortical structures, which convect downstream of the flow element thus energizing the otherwise separated flow area. By optimizing the pulsation frequency and the momentum injection through the openings according to the local flow phenomena a highly efficient active flow control system can be created. Usually, these fluidic actuators utilize valves or other active flow influencing means for the provision of the pulsed flow.

The leading edge separation of flow during high aerodynamic loads associated with large flow incidence angles is usually suppressed by mechanical devices such as slats and Krueger flaps. These usually comprise a distinct technical complexity, movable mechanical components and therefore produce high manufacturing and maintenance costs. Conventional leading edge high lift devices make use of several aerodynamic effects, which increase the incident range for which the flow can be kept attached to the surface of the trailing element. The most important effect thereof is the reduction of the low pressure suction peak of the following element, thus decreasing the destabilizing pressure rise on this element. To a certain extent also passive vortex generators are capable of keeping the flow attached to high flow incident angles. This is done by the creation of stream-wise vortex lines, which introduce energy into the boundary layer. However, usually those passive devices are not able to achieve the same gains, created by mechanic leading edge high lift devices and also produce parasitic drag in flight states where they are not necessary. Furthermore, in some regions, e.g. outboard areas of aircraft wings or other flow surfaces, these conventional methods may not be used, primarily through the lack of necessary installation space. Therefore, flow separation is usually the limiting factor for the design of those regions. Consequently a push of those natural boundaries would be beneficial for the overall efficiency of e.g. an aircraft.

BRIEF SUMMARY OF THE INVENTION

An aspect of the present invention provides a flow body that is subjected to surrounding flow having an active control system that resolves the drawbacks mentioned in the foregoing. In particular, an aspect of the present invention provides a flow body having an active control system which is capable of providing a suppression of flow separation for clearly increasing the efficiency compared to known active flow control systems with as few mechanical components as possible for reducing manufacturing and maintenance costs and potentially saving the weight of the high lift system.

The flow body according to an embodiment of the present invention has a surface, a leading edge and an active flow control system, wherein the active flow control system comprises a plurality of openings, at least one control pressure varying device and at least one fluidic actuator with an inlet connectable to an air source, at least two outlets and at least two control pressure ports, wherein the fluidic actuator is designed such that air from the inlet flows to the at least two outlets, wherein the openings are distributed along or parallel to the leading edge in a side-by-side relationship and extend through the surface and wherein the control pressure varying device is connected to the at least two control pressure ports in a fluidic manner, wherein the control pressure varying device is adapted to bring about the flow of the fluid at least majoritarily into a respective one of the outlets, and wherein each of the outlets is connected to one individual opening of the plurality of openings.

The flow body may be realized as one of a large variety of possible flow bodies. For example, the flow body may be a wing, a horizontal or vertical tail plane of an aircraft, a wing or a rotor of a wind turbine, a fuselage component of a vehicle, or any other body that is subjected to a surrounding flow. Basically the flow body has a surface that provides a geometrical delimitation and that defines aerodynamic characteristics that may necessitate an active flow control during a certain operation state. The leading edge of the flow body is an edge facing the impinging air flow. In case the flow body is a wing, a control surface, a tailplane or the such in a region usually not far of the leading edge a stagnation line is present that separates an upper and a lower part of the flow body. Generally speaking, e.g. on conventional wings as a flow body, the stagnation point may be found close to the region where the wing has its maximum curvature, wherein the stagnation line moves downstream on the lower side of the wing the higher the angle of attack increases. Due to the pressure rise at the downstream side of the suction peak flow separation may occur. The higher the peak (the lower the pressure) the higher the positive pressure gradient downstream of the peak, hence, it is more likely that the flow downstream of the peak is tending to separate.

The active flow control system comprises a plurality of openings that extend through the surface. By generating a pulsating flow of air through the openings by means of the at least one fluidic actuator the surrounding flow at the openings and downstream thereof is influenced.

A core piece of the fluidic actuator is the interaction chamber in which air flow coming from the inlet flows towards the openings, which are preferably positioned on the opposite side of the interaction chamber. By means of the control pressure ports an additional flow can be introduced into the interaction chamber, impinging on the main flow between the inlet and the outlets. Thereby, the main flow can be deflected in order to primarily flow through only one of the openings. As the at least two openings are directly connected to individual slits, the control pressure ports are a means for directly controlling the individual slit of which a majority of the main air flow is leaving. It is thereby not necessary to use valves or other mechanically moveable means to influence the flow path inside the fluidic actuator. The introduction of a pulsating control pressure at the control pressure ports results in a pulsating flow through the slits in the surface. The pulsation may be achieved by feeding back air from e.g. lines connected to the outlets or from lines connected to a control pressure supply.

For the purpose of better understanding following the main characteristics of such a fluidic actuator are explained in detail. Basically, the overall system may be a system comprising two stages: The first stage may be one or a plurality of fluid actuators that comprise a feedback loop and the second stage may be one or a plurality of fluid actuators controlled by the first stage. In this context a fluidic actuator is a ducting device with a central inlet port and at least two symmetrical arranged outlets. Strictly speaking it is an outlet duct which branches off into at least two outlets. Due to its symmetrical nature, theoretically the flow is equally distributed over all outlets. Since the aim of the device is to distribute the flow to a single or multiple, but at least to a dedicated portion of outlets, two control pressure ports are installed directly next to the inlet port of this first stage fluid actuator opposite to each other, e.g. lateral from the direction of flow between the inlet port and the outlets. If flow streams through one of those control pressure ports the flow coming from the supply is deflected in the interaction chamber to one side and therefore primarily flows through one of the outlets. The opposite direction can be triggered from the other side control pressure port.

The first stage has a feedback loop for the control pressure port on each side. This means, once one or at least a portion of outlet branches is supplied with the majority of flow supplied to the first stage this actuator is operating in a non symmetric fashion. Once this is the case a portion of outflow is subtracted and guided back to the control pressure port and control pressure line, respectively, mentioned before. For a fluid actuator with a single inlet port and two outlets, the case can be described like the following: The air supply coming from the inlet is divided equally to both outlets, but due to the fact that these fluidic actuators are subjected to a manufacture-related asymmetry, i.e., a manufacture-related unequal formation of individual parts, in particularly of branching sections, one of them will fundamentally always be preferred in terms of fluid dynamics. Consequently, one of the two outlets will receive a greater volume flow than the other. However, a portion of this flow is subtracted and guided back through a feedback loop to the left control pressure port and control pressure line, respectively. This disturbs the incoming flow and gives a strong inclination towards the right branch. There the opposite happens again and an overall pulsation frequency is adjusted to the outlets of the first stage. Hence, a pulsating operation is initiated. The degree of distribution to the individual outlets will increase with an increasing number of alternations until reaching a quasi-stationary state for the alternation between the two outlets.

The second stage has a much larger mass flow supply, since this is the flow, which shall be used for influencing the surrounding flow. Maybe the only difference between the first stage and the second are numerous in terms of geometry, number of devices etc., but from the general methodology they work similar. Thus, the outlets of the first stage are connected to the control pressure ports of the second stage. That is once stage 1 supplies flow to the left outlet, this flow is then transported to control pressure ports of the fluidic actuators of stage 2. Consequently, the large mass flow for the active flow control is guided to the openings opposite of this control pressure port.

The control pressure ports may be arranged such that the introduction of a control air flow is perpendicular to the main air flow. In other words, the chamber-like component is realized such that owing to alternating differences in the control pressures at the control openings, different outlet lines are supplied with fluid flow from the air source. Thus, the alternation of the different control pressure at control openings inside the chamber-like component corresponds to the alternating distribution of the fluid of the flow from the air source into the interaction chamber and thus to the alternating discharge of fluid pulses from the respective outlets.

The alternating discharge and the previously mentioned requirements, i.e. particularly the alternation of the control pressures, may take place periodically, i.e. at a harmonic frequency. The frequency may be situated in a range from 50 Hz to 250 Hz. Nevertheless an operation at a frequency in a range from 140 Hz to 160 Hz is particularly effective. It is, however, also possible for the pulses from the outlets and thus also the pulses of the control pressures to be generated in an irregular manner, i.e., to follow a combination of harmonic frequencies.

In such a fluidic actuator a minimum of mechanical parts is utilized in order to generate the different control pressures. In particularly simple embodiments no mechanical components are required at all. To this end, a fluidic actuator comprises a control pressure varying device which is equipped with a control air supply inlet and a control flow dividing device. The control flow dividing device is in fluid-communicating connection with the control air supply inlet and with the control pressure lines and is thus capable of distributing the flow from the control air supply inlet to the control pressure lines. The chamber-like component is configured such that by the supply of fluid through one of the control pressure lines in a greater degree than through the other control pressure lines the fluid flowing through the supply line correspondingly is deflected majoritarily into one respective outlet line associated to this control pressure line in an alternating manner.

A pressure varying device may furthermore comprise control pressure lines and a control flow dividing device. The control flow dividing device is provided with a branching section for branching the flow from the control air supply inlet into the control pressure lines. Furthermore two or more feedback lines are provided which are each connected to the respective control pressure line through a control pressure line outlet device situated downstream from the branching section and at least one control pressure line inlet device situated in the range of the branching section, which are arranged in each control pressure line downstream from each control pressure line outlet device in the direction of flow. The control pressure varying device may be configured such that a control air flow directed transversely to the flow in the central air supply exits from the respective control pressure line inlet device so as to majoritarily divert the flow in the control air supply inlet into a respective control pressure line situated opposite the control pressure line inlet device. Furthermore, the control pressure varying device may be configured such that the diversion into the control pressure lines and consequently also to the outlet lines takes place successively and alternatingly.

Instead of relying on a separate control device the fluidic actuator may also be realized with feedback lines branching off outlet lines, which are connected to the branching section so as to feed back air flow back into the branching section.

In an advantageous embodiment, as explained above, the fluidic actuator comprises an interaction chamber connecting the inlet with the at least two outlets and situated between the at least two control pressure ports, wherein the interaction chamber is adapted for deflecting a flow from the inlet primarily into one of the at least two outlets by means of a control air flow originating from the control pressure ports. The deflectability is depending on the actual design of the interaction chamber, the connection of the outlets and the position of inlets connecting to the control pressure ports. E.g. the outlets branch off a chamber opposite to the inlet, wherein control pressure lines connecting the control pressure ports with the interaction chamber are pointing into the chamber.

In an advantageous embodiment a plurality of fluidic actuators is connected to a single control pressure varying device. Thereby, an effective way of controlling a pulsating flow with a low weight is achievable.

It may be advantageous in a fluidic actuator if a control pressure line is at least partly directed against the direction of flow of the fluid flowing from the control air supply to the control pressure line associated to the respective feedback line.

It may moreover be advantageous if a throttle valve is arranged in at least one of the feedback lines in order to influence the velocity of the flow in this feedback line of one or more of the fluidic actuators. By this the alternation frequency of the pulsating operation can be varied. It may furthermore be advantageous if at least one throttle valve for changing the flow velocity of the flow in the control air supply inlet and thus of the fluid distributed to the control pressure lines is arranged in the control air supply inlet. Such a throttle valve serves to reduce the velocity of the flow in the control air supply inlet. Particularly at constant volume flows resulting e.g. from the bleed air of an aircraft engine, it is possible in this way to adjust from a maximum entrance velocity to a defined flow velocity in the control air supply inlet by means of the throttle valve. Alternation frequencies may be adjusted depending on the position of the respective openings on the flow body by means of the use of a plurality of control pressure varying devices with different frequencies. For example, if the flow body is an aircraft wing, the alternation frequency in positions further outboard may be different than in positions further inboard. Individual throttle valves may be realized as orifices for individual parts of the flow body, which orifices are adjusted so as to provide a predetermined pulsation frequency for the respective parts of the flow body.

It may be advantageous if the interaction chamber has convexly curved walls when viewed in the direction of the outlet lines from the interior of the interaction chamber, leading to a more stable flow along this wall due to the Coanda effect. Furthermore, the proportion of the flow conducted into the subsequent outlet line rises. While the fundamental presence of a minimum pressure difference is sufficient in the case of the control pressure lines, it may be advantageous for the purpose of increasing the efficiency of the fluidic actuator if a largest possible proportion of the fluid flow is conducted from the feed line into a respective one of the outlet lines so that the main part of the flow is output from one of the outlet openings during a pulse phase while substantially hardly any fluid flows out from the other outlet opening(s). A distribution of more than 80%, particularly more than 85%, in a preferred manner more than 90% to a single outlet line and thus to a single outlet opening is advantageous. In this way greater pulse differences are created between the outlet openings, so that the effect of the pulsation and thus the effect of influencing the flow by means of the fluidic actuator of the present invention are optimized.

It may also be advantageous if the control air supply inlet or a line associated therewith of the control pressure varying device has convexly curved walls when viewed in the direction of the control pressure lines from the interior of the control air supply inlet or a line associated therewith. In this way the application of the flow to a respective one of the walls results, in the same manner as described in the foregoing for the interaction chamber, in the formation of a stable flow along this wall into the respective control pressure line if a control pressure line situated in continuation of this wall is majoritarily supplied with flow by the alternatingly distributed flow from the control air supply inlet. In this way it is possible even with a low distribution performance on the part of the control pressure line outlet devices to majoritarily distribute relatively large proportions of the arriving flow from the control air supply inlet to one of the control pressure lines, so that even with a low total volume flow from the control air supply inlet a relatively large control pressure may be generated at one control pressure line and a correspondingly lower control pressure at the other control pressure line.

In an advantageous embodiment the openings comprise a flow axis that includes an angle with local tangent to the surface that is below 90° in a downstream direction. The extension of the opening through the surface is therefore not perpendicular to the surface but instead is pointing more into a downstream direction, leading to a certain blow-out angle. Thereby, the efficiency of the pulsated ejection of air is increased as the fluidic communication with the local flow pattern downstream of the respective openings is improved.

In a further advantageous embodiment the at least one fluidic actuator is arranged in a straight extension of the associated openings. Thereby, necessary bends for connecting the fluidic actuator to the respective openings may be reduced to a minimum. If, however, bends are still necessary, they shall be arranged preferably in a chamber-like component or a branching section of the fluidic actuator, e.g. an interaction chamber. It should be avoided to arrange bends in a fluidic control device. Thereby, a high efficiency may be reached.

In a still further advantageous embodiment the openings are realized as slits. The use of slits may be beneficial for blowing out air over a distinct length of the opening for achieving an interaction with the surrounding flow, but does have little effect in flow conditions where no air is blown out through the openings. Slits are an efficient way to control the local flow pattern in a region of interest that spans along the whole flow body.

In a further advantageous embodiment the slits are arranged in parallel to the leading edge. Thereby, the separation of flow basically in proximity to a recompression following a suction peak on the flow body may be prevented.

In a further advantages embodiment the slits comprise a width (w) and a depth (d), wherein the ratio of width to depth is at least 5 and preferably at least 10. Thereby excessive geometrical measures of the fluidic actuators and consequently excessive weight and necessary installation space may be avoided and the velocity profile of air blown out of the slits may be improved.

In a further advantageous embodiment adjacent slits are separated from each other by means of a web. All adjacent slits are connected to a fluidic actuator and thereby the longitudinal extension of the active flow control means depends on the individual size of the slits and the number of fluidic actuators. By the separation all individual slits may be dimensioned such that the combination of slits and fluidic actuators may provide an efficient flow control. Therefore, adjacent fluidic actuators do not interfere with each other as they each are connected to discrete openings.

In a still further advantageous embodiment the openings are closable through closing means. In situations where no active flow control is necessary, e.g. during cruise flight of an aircraft, an active flow control and therefore the openings are not needed. In order to avoid the accumulation of dirt or fluid in the openings and a minor production of drag the openings may be closed in these states. For the purpose of the initiation of an active flow control the openings may be opened again. A closing means for opening or closing the openings may be realized by a plurality of different devices. It is preferable to connect the closing means with means that are used in situations where the active flow control is necessary. For example, the openings may be integrated into a wing structure situated below high lift devices. In normal operation, i.e. cruise flight, the openings are covered by the high lift devices, e.g. slats. During high lift phases, where the high lift devices are extended and greater angles of attack are experienced, the openings are uncovered.

In a still further advantageous embodiment the openings are arranged in a first part of the flow body, wherein the closing means are realized as a second part of the flow body that is movable relative to the first part so as to cover the openings. For example, if the flow body is a wing, the movable component may be a flap that is connected to the wing, which flap is only extended from the wing during high lift conditions. The flap may be realized as a slat or a droop nose. Thereby, the openings may be positioned in a region where they are covered during cruise flight, such that an active flow control can be established as long as the flap is extended.

In a still further embodiment the openings are arranged downstream of a region of the lowest pressure coefficient. Thereby the boundary layer in a region where it is in danger of separating due to a large positive pressure gradient, that is, a recompression aft the maximum suction peak, is energized.

The invention also relates to a vehicle, comprising at least one flow body according to the explanation above and an air source, which air source is connected to the active flow control system. In a preferred embodiment the vehicle is an aircraft. In a further preferred embodiment, the flow body is a wing, a tailplane, an add-on body and/or a fuselage.

Still further, the air supplied by the air source may comprise a temperature sufficient for a thermal de- or anti-icing of the flow body. Thereby, a distinct reduction of weight may be achieved.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, irrespective of their composition in the individual claims or their interrelationships. Furthermore, identical or similar components in the figures have the same reference characters.

FIGS. 7a, 7b and 7c exemplary show the connection to an air source and the use of throttle valves.

DETAILED DESCRIPTION

Figure 1:
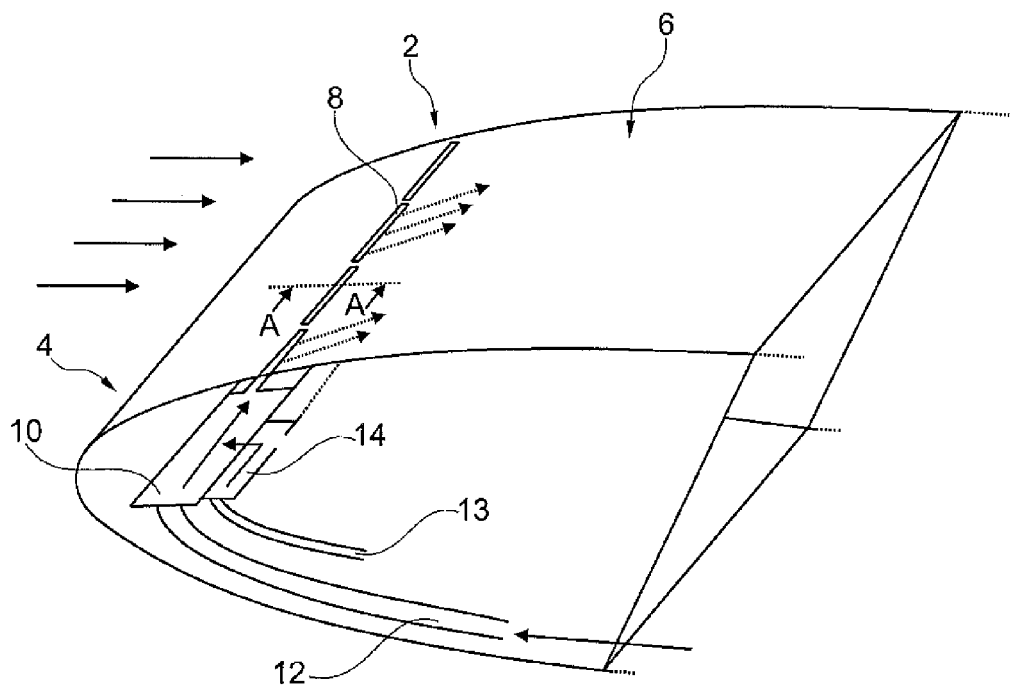
FIG. 1 shows a flow body with fluidic actuators and a control pressure varying device in a three-dimensional view.
Figure 1:
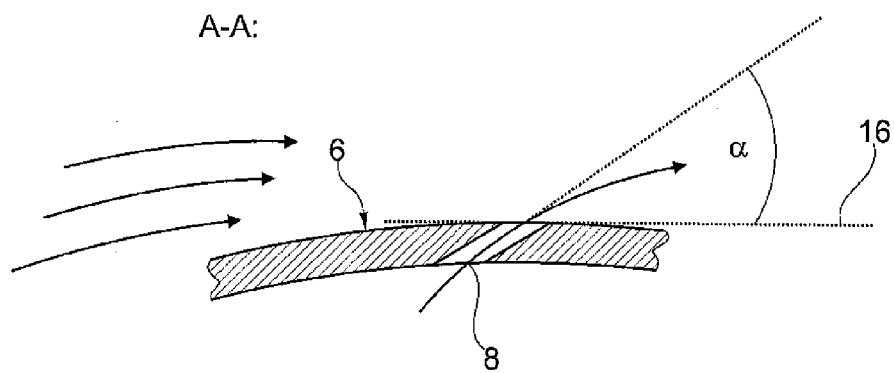

FIG. 1 shows a flow body 2 in the form of a wing of an aircraft in a three-dimensional, sectional view, the flow body 2 having a leading edge 4 and a surface 6, wherein a plurality of openings in the form of adjacently located slits 8 is arranged in the surface 6. The slits 8 are connected to an array of fluidic actuators 10 that are adapted for providing a pulsed air flow from an air source 12 for influencing a surrounding flow through the control by a control pressure varying device 14. The fluidic actuators 10 are arranged in a linear extension of the slits 8 and therefore are connected to the slits 8 as directly as possible. The fluidic actuators 10 and the control pressure varying device 14 are arranged in a staggered manner and create two levels under the surface 6 on the inside of the flow body 2.

The slits 8 are arranged substantially parallel to the leading edge 4 and preferably span along the whole extension of the flow body 2. Thereby, a region of interest, where flow separation may take place, may be influenced such that a flow separation on the whole flow body 2 can be suppressed. By the ejection of a pulsed air flow into the surrounding flow around the flow body 2 the flow separation is prevented or separated flow will be reattached to the surface 6.

The flow body 2 further comprises a main air source 12 and a control air source 13, the latter of which is connected to the pressure control device 14 controlling the pulsating operation of the fluidic actuators 10. The fluidic actuators 10 furthermore do not rely on moveable parts for the generation of air flow pulses as explained further below.

The slits 8 extend through the surface 6 in an angular relationship. In known active flow control systems openings extend perpendicularly through the surface. Contrary to this, in the present invention the openings 8 extend through the surface under an air blow angle α as an angle included by the air blow vector and a tangent 16 in a downstream direction, as indicated in a sectional view A-A through an exemplary slit 8. It is preferred that the air blow angle α is lower than 90° and preferably in the range of 30 to 60° and especially about 45°.

Figure 2:
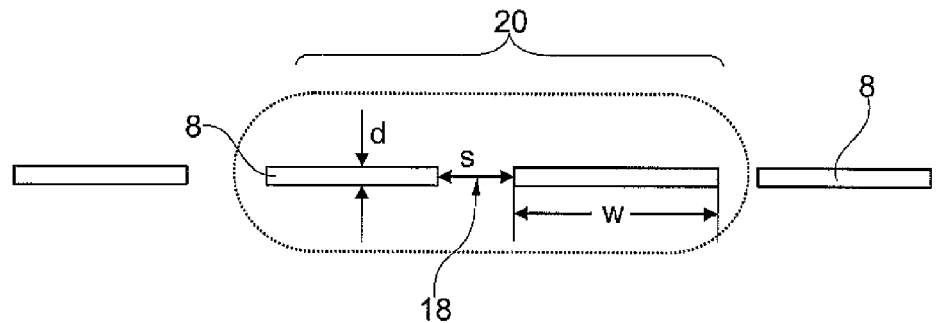
FIG. 2 shows a detailed view of the openings on the surface.

In FIG. 2 a detail of the flow body 2 is shown. The slits 8 comprise a width w and a depth d and are separated by a web 18 that spans over a distance s. Two adjacent slits 8 are connected to two outlets of one single fluidic actuator 10 as indicated by a parenthesis 20. It is beneficial that the ratio between width w and depth d is at least 5 and preferably at least 10 in order to provide an efficient means for influencing the flow pattern on the surface 6 at the same time reducing the necessary volume flow and parasitic drag. Furthermore, the distance s between two adjacent slits 8 may be smaller than the width w of the slits 8.

Figure 3:
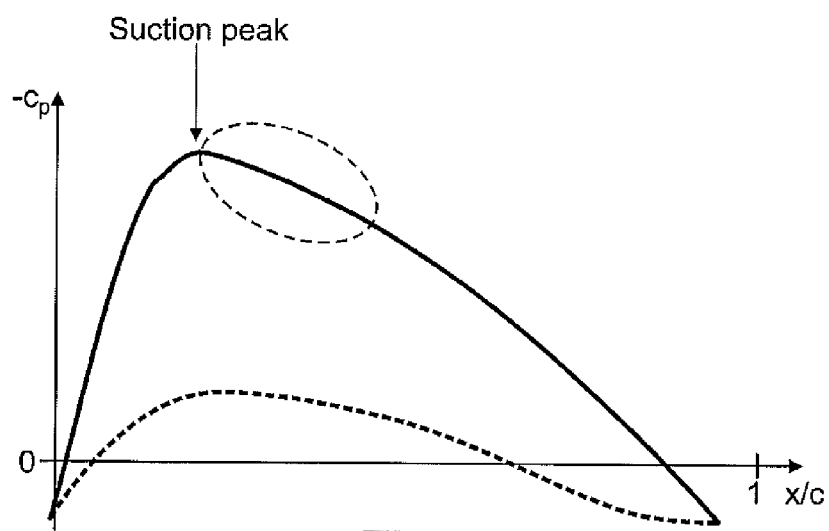
FIG. 3 shows a possible trend of an exemplary pressure coefficient of a wing as a flow body.

It is beneficial to position the slits 8 in a range on the surface 6 downstream of a location of minimum pressure coefficient $c_p$. As FIG. 3 shows by means of a qualitative pressure coefficient curve, this location may be e.g. in a first third of the profile depth of a wing as a flow body on its upper side. Here, the negative of $c_p$ and a location along the x-direction in normalized measure is shown. A maximum (minimum negative) pressure coefficient $c_p$ is reached in a place on the surface 6 relatively near to the leading edge 4, which leading edge is symbolized as "0" on the x-axis. This position is also known as stagnation point. Generally speaking, the stagnation line may be found in a region where the local profile of the wing has its maximum curvature. Therein, a suction peak is present that tends to separate the flow on the wing as the flow has to overcome a distinct pressure increase after this peak on the wing surface. In influencing the local flow by means of introducing air into or sucking off air off the region of interest the separation is eliminated or at least clearly reduced. As the actual position of the stagnation point depends on the characteristics of the wing profile, the openings may be positioned on the upper side of the wing, the lower side of the wing or may extend from the lower side of the wing to its upper side, in each case preferably downstream of the suction peak.

Figure 4A:
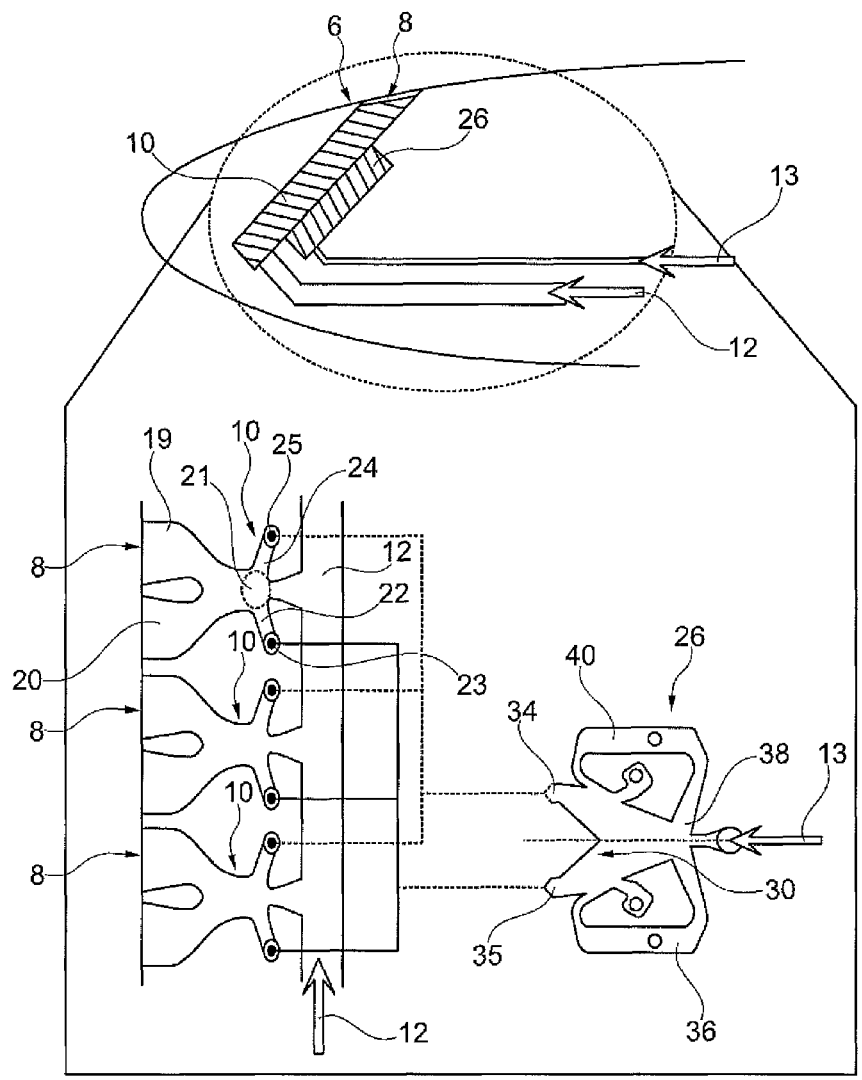
FIGS. 4a, 4b and 4c shows a flow body with fluidic actuators and a control pressure varying device in three sectional views.
Figure 4B:
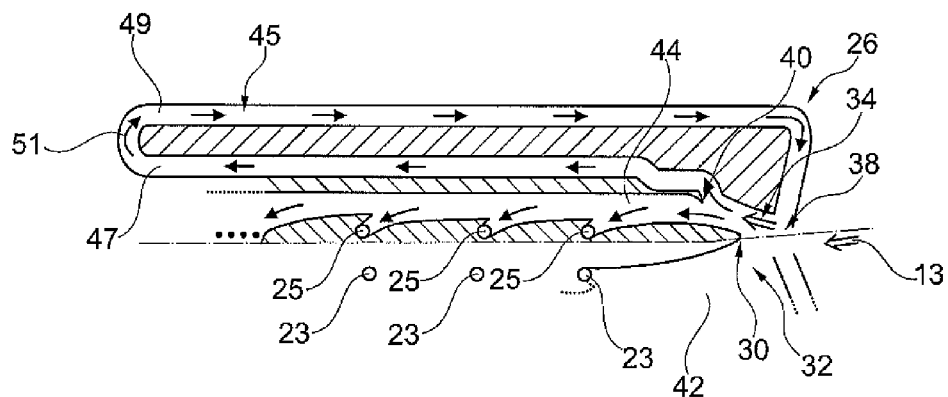
Figure 4C:
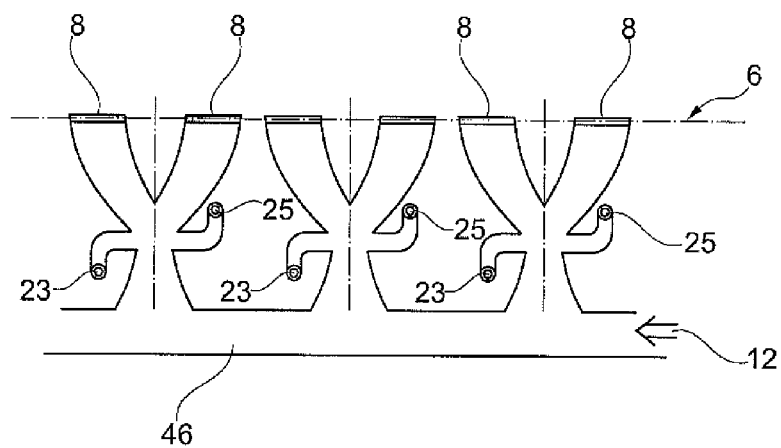

The connection of an exemplary fluidic actuator 10 and the air source 12 is shown in detail in FIGS. 4a-4c. An array of fluidic actuators 10 is arranged directly at the slits 8, wherein each fluidic actuator comprises a first outlet 19 and a second outlet 20. These outlets 19 and 20 are each connected to one individual slit 8. Therefore, each slit 8 is connected to one individual outlet 19 or 20 of one individual fluidic actuator 10.

In the example shown in FIG. 4a each fluidic actuator 10 of the array of fluidic actuators 10 comprises an interaction chamber 21 where a first control pressure port 23, a second control pressure port 25 and a main air source 12 are connected to. The control pressure ports 23 and 25 are located such that they may introduce air into the interaction chamber 21 roughly perpendicular to the main flow from the air source 12 or with an additional vectorial component in the main flow direction. For the fluidic actuator 10 to output air through the first outlet 19 or the second outlet 20 a control air flow is introduced into the control pressure ports 23 and 25 through the selective application of a control pressure by means of control pressure lines 22 and 24. The air flow from the main air source 12 and flowing into the interaction chamber 21 is thereby deflected either into the first outlet 19 or the second outlet 20.

In order to generate such a pneumatic control signal a fluidic control system with at least one control pressure variation device 26 is present. Such a control pressure variation device 26 comprises a port for a connection to a control air supply 13 and a flow dividing device 30. The flow dividing device 30 merges into a first control pressure line 32 or first outlet and a second control pressure line 34 or second outlet. Branching off from the control pressure line 32 there is a feedback line 36 that feeds air flowing from the control air supply 13 to the first control pressure line 32 back into a branching section 38, which branching section is comparable to the interaction chamber 21 as the control pressure variation device 26 is similarly designed as the fluidic actuators 10. Thereby, the flow coming from the control air source 13 is influenced by the fed back air flow and thus is deflected into the second control pressure line 34. As soon as the flow through the second control pressure line 34 occurs, another feedback line 40, which feedback line 40 branches off from the second control pressure line 34, feeds back air into the branching section 38 and thereby leads to a deflection of the main air flow back into the first control pressure line 32. This switching action takes place automatically and therefore leads to a pulsating flow.

This pulsating flow present in the control pressure lines 32 and 34 of the control pressure variation device 26 is then fed into the first control pressure port and the second control pressure port 25 of one or a plurality of the fluidic actuators 10 by means of the control pressure lines 22 and 24. Thereby it is possible to use one single control pressure variation device 26 for controlling a plurality of fluidic actuators 10 for generating a pulsating flow without the necessity of mechanically moveable elements. The serial connection of the control pressure varying device 26 and fluidic actuators 10 is advantageous as the pulsating effect in the control pressure varying device is clearly amplified.

FIG. 4b shows a half of a symmetrical control pressure varying device 26 again as arrangeable in elongated flow bodies, e.g. a wing of an aircraft. Here, the control varying device 26 is of the same type as shown in FIG. 4a and of a very similar or basically the same design as the fluidic actuator 10. The control pressure varying device 26 is connected to a plurality of control pressure ports 23 and of individual fluidic actuators 10. For the purpose of distributing the control air flow to a plurality of different fluidic actuators the control pressure varying device 26 exemplarily comprises a branching section 40 downstream of each outlet 32 and 34, from which control pressure distribution lines 42 and 44 are supplied with air from the respective outlet 32 and 34. For example, a plurality of control pressure ports 25 of fluidic actuators 10 are connected to the upper control pressure distribution line 44, which distribution line 44 is preferably extending directly under the array of fluidic actuators 10. As the control pressure ports 23 and 25 are connected to the control pressure distribution lines 42 and 44 it may be feasible to use control pressure lines 22 and 24 extending perpendicularly to the control pressure distribution lines 42 and 44, exemplarily in direction of the airfoil thickness, to reach the layer of the fluidic actuators 10.

Further, it is shown that a feedback line 45 for generating a pulsating flow may have a particular shape that allows adjusting the pulsation frequency to a required value. By increasing the volume of the feedback line 45, i.e. increasing the length at a constant cross sectional area or increasing the cross sectional area at a constant length, the resulting pulsation frequency will be decreased. Exemplarily, the feedback line 45 has an outgoing section 47, an incoming section 49 and a coupling section 51 that connects the outgoing section 45 and incoming section 49 by means of a 180° bend. Both the outgoing and incoming sections 47 and 49 are arranged substantially parallel to the leading edge 4. The length of the outgoing section 47 is greater than of the incoming section 49. Furthermore, the length of the incoming section 49 is greater than the length of connection sections 51 connecting to the control pressure varying device, e.g. by the factor of at least 2. Of course other variants may be possible without departing from the core of the invention. Therefore, the active flow control system may easily be adapted without the necessity for throttle valves or other flow influencing means.

As shown in FIG. 4c a main air supply line 46 may extend through the whole required length of the array of fluidic actuators 10 and, in order to safe installation space, may be arranged directly parallel to the control pressure distribution lines 42 and 44.

Additionally, the feedback lines 36, 40 and 45 may comprise throttle valves in the form of orifices or other flow influencing means (not shown in detail) for the purpose of adjusting the pulsation frequency.

Figure 5:
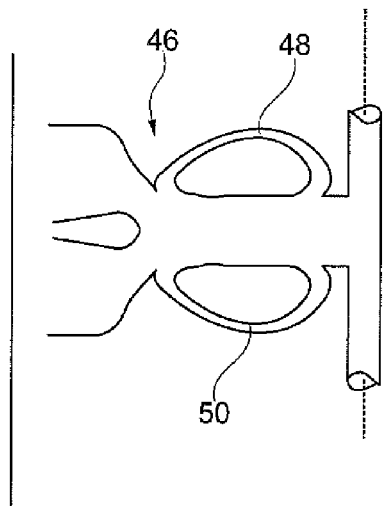
FIG. 5 shows a modification of a flow body of FIG. 4.

FIG. 5 shows an alternative exemplary embodiment in form of a fluidic actuator 46 that is adapted for controlling the air flow without the necessity of a separate control device. There, feedback lines 48 and 50 are integrated into fluidic actuators 46 such that they are adapted for generating a pulsating flow on their own.

Figure 6:
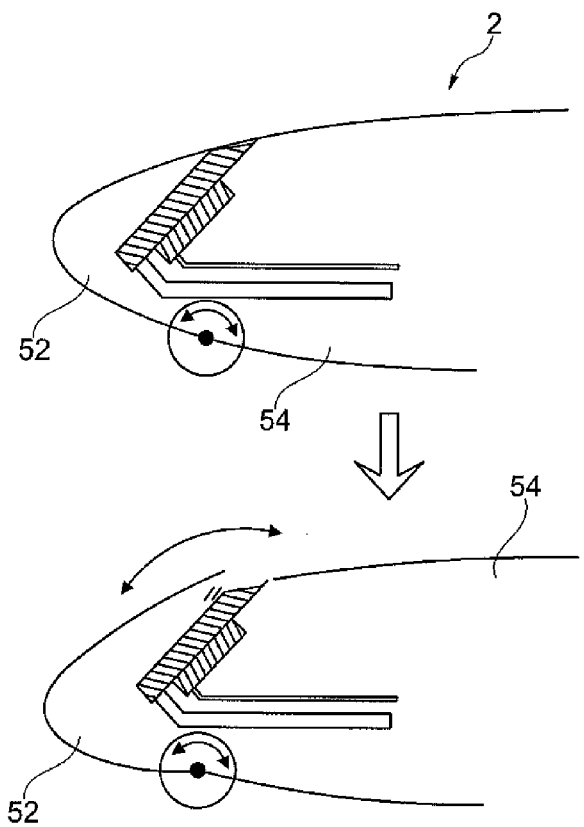
FIG. 6 shows a modification of the flow body that is capable of covering and uncovering of the openings.

FIG. 6 shows an example of a closing means for opening or closing the openings on the flow body 2. As an example, the flow body 2 is a wing with a wing nose 52, which wing nose 52 is supported in a swivelable manner on a wing structure 54. Also, the wing nose 52 may be replaced by a flap or slat that is moveably supported preferably on the upper side of the wing 2.

FIG. 7a show an arrangement 55 of an aircraft engine 56 that comprises at least one bleed air port that is adapted to supply pressurized air to the control pressure varying device 26 that is connected to exemplary two fluidic actuators 10.

Figure 7B:
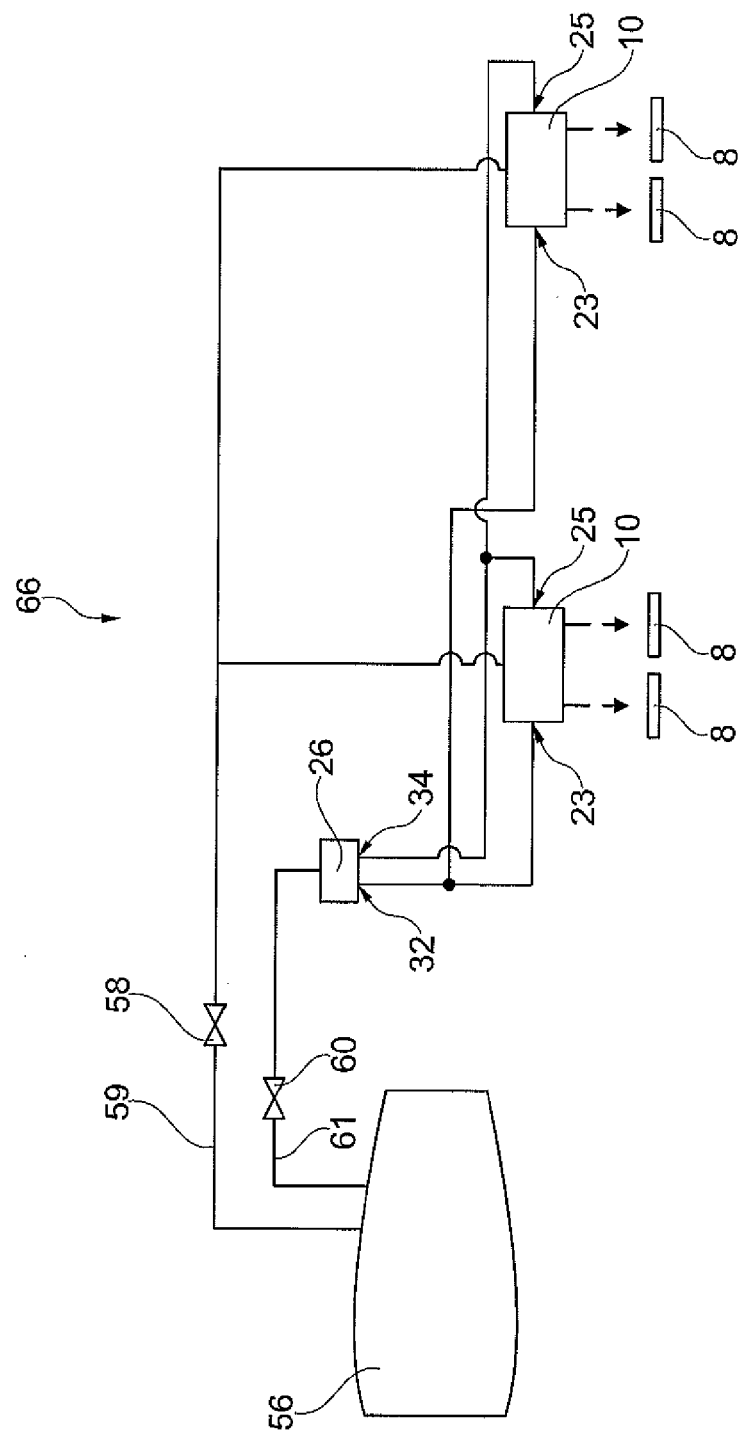

FIG. 7b shows another exemplary arrangement 66 with two throttle valves 58 and 60 in pressurized air lines 59 and 61. With the aid of these throttle valves 58 and 60 it is possible to throttle the arriving fluid flow, i.e. to decelerate its velocity, or to minimize the volume flow.

Figure 7C:
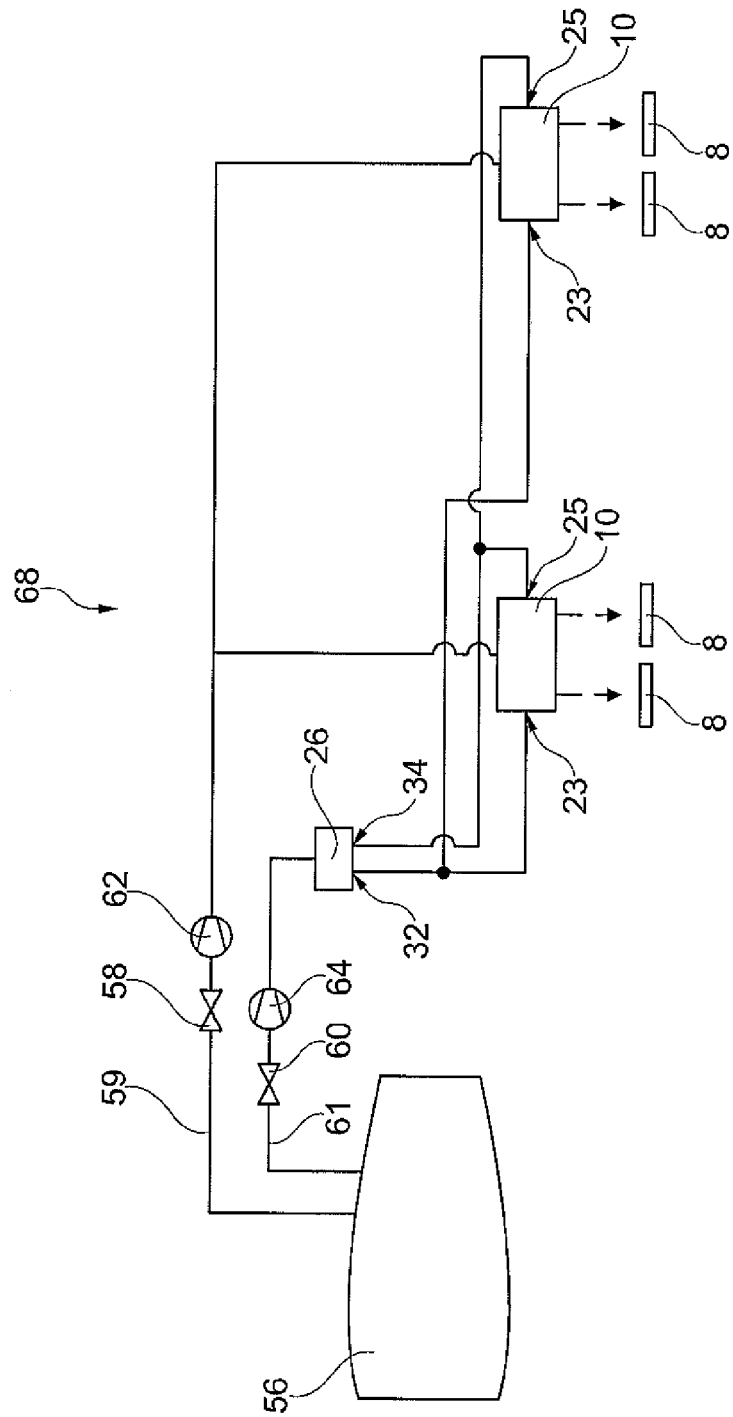

Vice versa, as shown in an arrangement 68 of FIG. 7c, it is also possible with the aid of compressors 62 and 64 arranged behind—or contrary to the representation of FIG. 7c before— the throttle valves 58 and 60 to increase the velocity of the fluid flow or to increase the volume flow, respectively. By means of these compressors 62 and 64 a pressure increase or an increase of the volume flow may be carried out. With corresponding sensors it is possible in this way for a substantially constant status to be adjusted and remain adjusted both in the control pressure varying device 26 and in the fluidic actuators 10.

Of course, also only one of the throttle valves 58 and 60 may be used without the other one and, additionally, further throttle valves may be used between the control pressure varying device 26 and the individual fluidic actuators.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A flow body having a surface, a leading edge and an active flow control system,
   wherein the active flow control system comprises:
      a plurality of openings;
      at least one control pressure varying device; and
      at least one fluidic actuator with:
         an inlet connectable to an air source;
         at least first and second outlets; and
         at least first and second control pressure ports, wherein the fluidic actuator is configured such that air from the inlet flows to the at least first and second outlets,
   wherein the control pressure varying device comprises:
      a flow dividing device with an inlet connectable to a control air source;
      at least third and fourth outlets, the third outlet in fluidic communication with the first control pressure port and the fourth outlet in fluidic communication with the second control pressure port; and
      a first and a second feedback line associated with the third and fourth outlet, respectively, adapted for feeding back a part of a control air flow into the flow dividing device,
   wherein the openings are distributed along or parallel to the leading edge in a side-by-side relationship and extend through the surface, and
   wherein the control pressure varying device is adapted to bring about the flow of the fluid at least majoritarily into a respective one of the first and second outlets, and
   wherein each of the first and second outlets is connected to one individual opening of the plurality of openings.

2. The flow body of claim 1, wherein the fluidic actuator comprises an interaction chamber connecting the inlet with the at least first and second outlets and situated between the at least first and second control pressure ports, wherein the interaction chamber is adapted for deflecting a flow from the inlet primarily into one of the at least first and second outlets by a control air flow originating from the control pressure ports.

3. The flow body of claim 1, wherein a plurality of fluidic actuators is connected to a single control pressure varying device.

4. The flow body of claim 1, wherein at least one of the volume and the length of each feedback line is dimensioned so as to adjust the pulsation frequency of the control pressure varying device to a predetermined value.

5. The flow body of claim 1, wherein the openings comprise a flow axis including an angle (a) with a local tangent to the surface below 90° in a downstream direction.

6. A flow body; having a surface, a leading edge and an active flow control system,
   wherein the active flow control system comprises:
      a plurality of openings;
      at least one control pressure varying device; and
      at least one fluidic actuator with:
         an inlet connectable to an air source;
         at least first and second outlets; and
         at least first and second control pressure ports, wherein the fluidic actuator is configured such that air from the inlet flows to the at least first and second outlets,
   wherein the control pressure varying device comprises:
      a flow dividing device with an inlet connectable to a control air source;
      at least third and fourth outlets, the third outlet in fluidic communication with the first control pressure port and the fourth outlet in fluidic communication with the second control pressure port; and
      a first and a second feedback line associated with the third and fourth outlet, respectively, adapted for feeding back a part of a control air flow into the flow dividing device,
   wherein the openings are distributed along or parallel to the leading edge in a side-by-side relationship and extend through the surface,
   wherein the control pressure varying device is adapted to bring about the flow of the fluid at least majoritarily into a respective one of the first and second outlets,
   wherein each of the first and second outlets is connected to one individual opening of the plurality of openings, and
   wherein the at least one fluidic actuator is arranged in a straight extension of a flow axis of the associated openings.

7. The flow body of claim 1, wherein the openings comprise a width and a depth, wherein the ratio of width to depth is at least 5.

8. The flow body of claim 1, wherein adjacent openings are separated from each other by a web.

9. The flow body of claim 1, wherein the openings are closable through closing means.

10. A flow body having a surface, a leading edge and an active flow control system,
   wherein the active flow control system comprises:
      a plurality of openings;
      at least one control pressure varying device; and
      at least one fluidic actuator with:
         an inlet connectable to an air source;
         at least first and second outlets; and
         at least first and second control pressure ports, wherein the fluidic actuator is configured such that air from the inlet flows to the at least first and second outlets,
   wherein the control pressure varying device comprises:
      a flow dividing device with an inlet connectable to a control air source;
      at least third and fourth outlets, the third outlet in fluidic communication with the first control pressure port and the fourth outlet in fluidic communication with the second control pressure port; and
      a first and a second feedback line associated with the third and fourth outlet, respectively, adapted for feeding back a part of a control air flow into the flow dividing device,
   wherein the openings are distributed along or parallel to the leading edge in a side-by-side relationship and extend through the surface,
   wherein the control pressure varying device is adapted to bring about the flow of the fluid at least majoritarily into a respective one of the first and second outlets,
   wherein each of the first and second outlets is connected to one individual opening of the plurality of openings,
   wherein the openings are arranged in a first part of the flow body and wherein a swivellable wing nose configured as a second part of the flow body is movable relative to the first part so as to selectively cover and uncover the openings.

11. The flow body of claim 1, wherein the air supplied by the air source comprises a temperature sufficient for a thermal de- or anti-icing of the flow body.

12. The device of claim 3, further comprising:
   a first pressure distribution line fluidically connecting the third outlet to the first pressure control ports of the plurality of the actuators; and
   a second pressure distribution line fluidically connecting the fourth outlet to the second pressure control ports of the plurality of the actuators.

* * * * *